K. G. BLOMBERG AND B. A. PETTERSSON.
MACHINE FOR PRODUCING SPRING DRESS FASTENERS.
APPLICATION FILED OCT. 17, 1919.
1,395,899.
Patented Nov. 1, 1921.
3 SHEETS—SHEET 1.
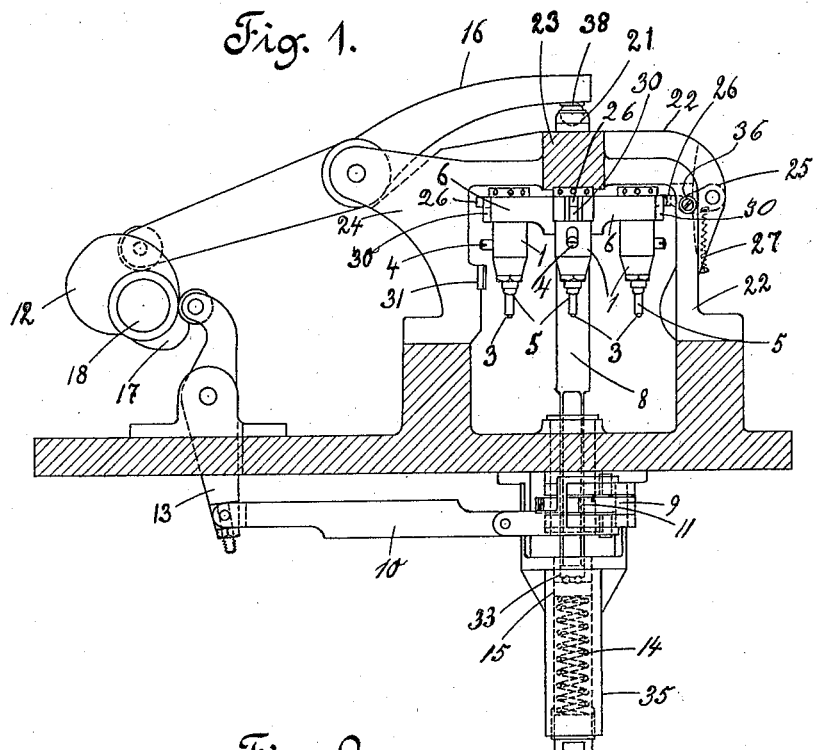

K. G. BLOMBERG AND B. A. PETTERSSON.
MACHINE FOR PRODUCING SPRING DRESS FASTENERS.
APPLICATION FILED OCT. 17, 1919.
1,395,899.
Patented Nov. 1, 1921.
3 SHEETS—SHEET 2.
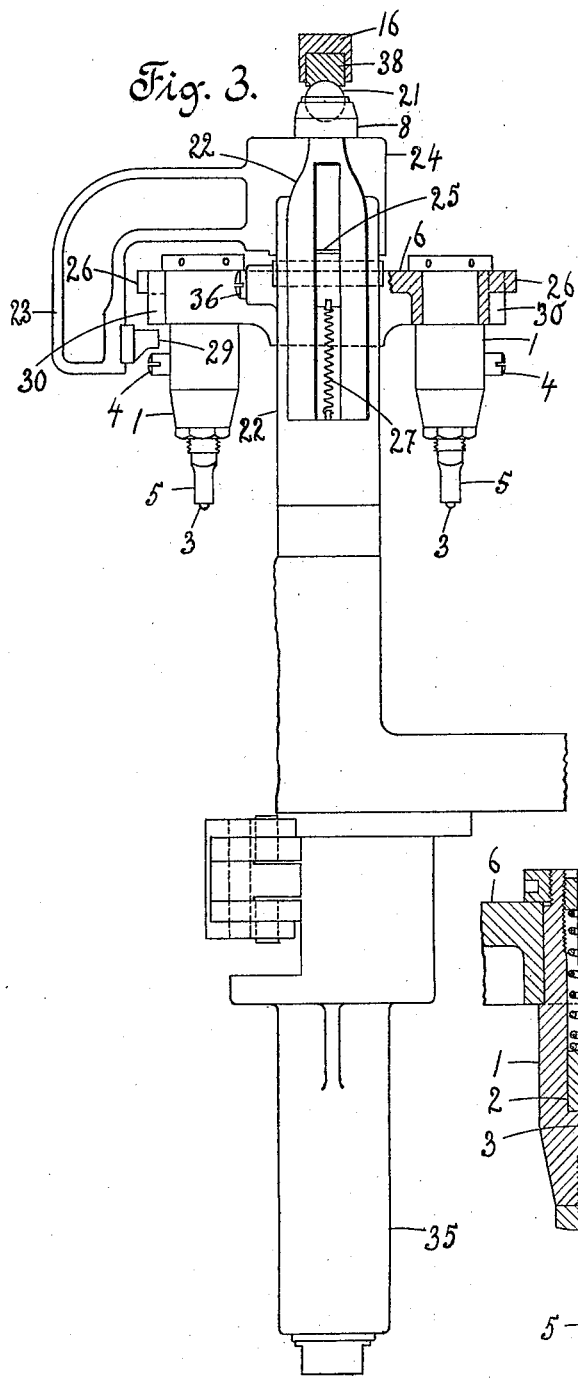
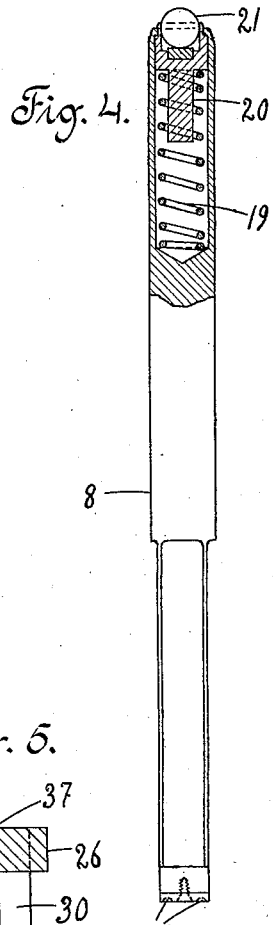
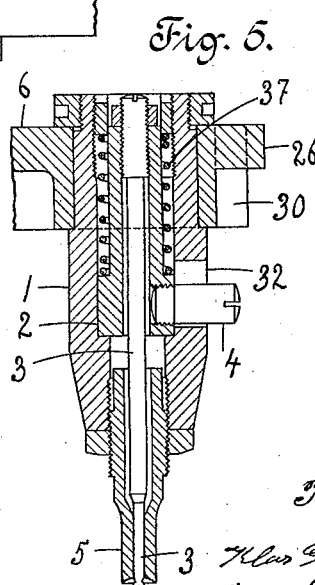
Inventors:
Klas Gustav Blomberg
Bengt August Pettersson K. G. BLOMBERG AND B. A. PETTERSSON.
MACHINE FOR PRODUCING SPRING DRESS FASTENERS.
APPLICATION FILED OCT. 17, 1919.

1,395,899.

Patented Nov. 1, 1921.
3 SHEETS—SHEET 3.

UNITED STATES PATENT OFFICE.

KLAS GUSTAV BLOMBERG, OF SÖDERTÄLJE, AND BENGT AUGUST PETTERSSON, OF LIDKÖPING, SWEDEN.

MACHINE FOR PRODUCING SPRING DRESS-FASTENERS.

1,395,899.  Specification of Letters Patent.  Patented Nov. 1, 1921.

Application filed October 17, 1919. Serial No. 331,511.

*To all whom it may concern:*

Be it known that we, KLAS GUSTAV BLOMBERG, a subject of the King of Sweden, residing at Södertälje, in the Province of Södermanland and Kingdom of Sweden, and BENGT AUGUST PETTERSSON, a subject of the King of Sweden, residing at Lidköping, in the Province of Västergötland and Kingdom of Sweden, have invented new and useful Improvements in Machines for Producing Spring Dress-Fasteners, (for which we have filed an application in Sweden, Sept. 17, 1918,) of which the following is a specification.

The device described in the following is an improvement in dress fastener making machines with the object of providing a convenient transportation of the blank fastener from the time it is cut out of the strip throughout the various operations to which the blanks are subjected before they are completely finished. The transporter is composed of a cross shape piece supported by and obtaining a rotative motion from a revolving vertical spindle. Each of the four arms of the cross carries a vertical socket in the outer part of which socket there is a spring pin that is made in such a way as to enable it to hold the blank fastener.

The constructional details of the invention are made clear by the annexed drawings, whereof—

Figure 1 shows the device from the side and partially in section.

Fig. 2 shows an arrangement for rotating the cross piece.

Fig. 3 shows the arrangement seen from the right-hand side in larger scale.

Figs. 4, 5 and 8 show details.

Figure 6:
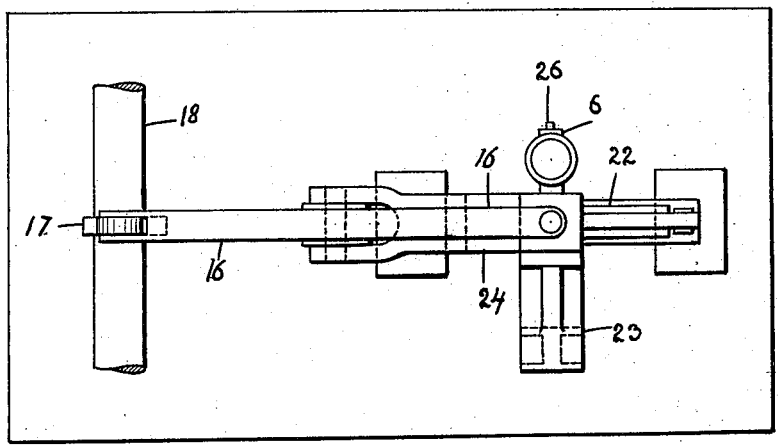
Fig. 6 shows the stand that supports the transporter cross in a horizontal projection.

Each one of the arms 6 of the transporter cross carries in the outer end a socket 1 containing a slide 2 which is held down in the socket by means of a spring 37. In the slide is a pin 3 that projects beyond the socket and has the upper end screwed into the slide and the lower end shaped as a ball which can enter the knob of the top fastener when the latter leaves the cutting out die. A pin 4 is screwed into the slide 2 and is placed in a slot 32 in the socket. In the lower part of the socket is a tube 5 screwed in through which the pin 3 passes, and which tube is capable of pushing off a fastener held by the pin when the slide with the pin fitted in same is carried upward by the pin 4. The four-armed cross piece 6 which supports four sockets of the kind just described is fitted on a spindle 8. The spindle is squared at the bottom (Fig. 4) and passes through the table to a device for the turning of the spindle. The turning is intermittent so that in the present case, with a four-armed cross piece, the spindle is given a quarter turn each time. The turning is effected by a ratchet wheel 9 through which slides the spindle 8, the ratchet wheel having four notches, and a pawl 11 fixed to a reciprocating link 10. The movement of the link 10 is produced by a cam 12 and lever 13 connected to same. The spindle 8 is also movable vertically and can therefore be shifted in the square hole 34 of the ratchet wheel and passing through same enters a sleeve 35 attached to the frame. The said sleeve contains a coiled spring 14 on which the spindle rests with a ball thrust bearing 33 and washer 15 interposed. A rocker arm 16 is in contact with the top end of the spindle and receives a vertical reciprocating motion through the cam 17.

The cams 17 and 12 which latter effects the turning of the spindle are placed on a shaft 18 and are adjusted in such relation to one another that the spindle is turned a moment after the pressing down has taken place, *i. e.* when the spindle is occupying its top position.

In order to prevent the spindle or other part of the device from breaking, if something should interfere with the down movement, a safety spring 19 is fitted in a recess in the top part of the spindle. The spring 19 acts on a pin 20 which supports a ball 21 which latter serves as contact for the rocker 16. Owing to the fact that the spring 14 that supports the spindle is weaker than the spring 19 the spring 14 is compressed when the arm 16 is brought down, but, if anything should interfere with the downward movement of the spindle, the only result of the action of arm 16 will be the compression of the spring 19.

A stud 38 or contact piece, secured to the arm 16, comes in contact with the ball 21, and is sufficiently high to permit the arm 16 to be lowered as much as demanded by the action of cam 17 without forcing down the spindle 8.

Figure 7:
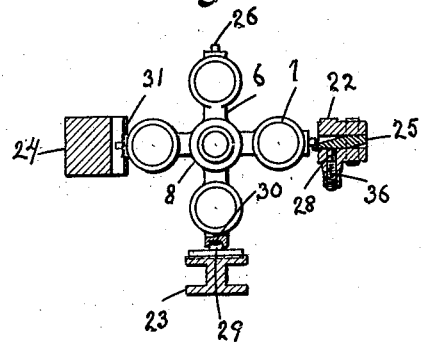
Fig. 7 is a horizontal projection of the transporter cross.

The spindle 8 has its bearings in a stand or frame which in the present case is provided with three arms 22, 23 and 24, see Figs. 6 and 7. At the arm 22 is fitted a stop block 25 (see Fig. 7) which acts together with a lug 26 on each arm of the cross, the object of the contrivance being to stop the cross piece in the correct position after every turning impulse. The stop block 25 is movably fitted on the arm 22 and is held down in its groove by a spring 27 and held to one side by a spring 36 which is acted on by a pin 28. The arm 23 carries a guide pin 29 (Figs. 3, 7), which fits in a guide slot 30 (Figs. 5, 7) in each of the arms 6 of the cross, and which serves to guide the cross when moved vertically. When the transporter cross moves downward the guide stud (29) enters the slot (30) before the lug (26) has released the stop block (25). As the cross later on moves upward the lug (26) raises the stop block (25) which has been moved to one side by the spring (36) so that the lug (26) on the upward movement comes in contact with the stop block (25). The cross can now be turned a quarter turn around. After this has been done the stop block (25) is pulled down by the spring (27) which enables the stop block (25) to arrest the movement of the next arm (6). The third arm 24 carries a push-off plate 31 against which the pin 4 in the slide 2 strikes when the spindle is moved downward for the purpose of pushing the fastener from the pin 3 after all the operations in the machine have been carried out.

The device operates in the following manner:—

When the spindle is brought downward one of the pins 3 fitted on same grasps the blank fastener in the place where it has been cut out of the metal strip. The spindle is then turned so that the fastener will be above the place where the spring is to be introduced, which in the present design is the spot where the spindle is guided vertically, i. e., directly opposite the arm 23. During the downward movement of the spindle the spring is placed on the fastener, which process is described in detail in the patent application filed with the Serial Number 331,514. After the succeeding turning impulse the fastener will be directly in front of the arm 24 and is pushed off the pin during the downward movement of the spindle. At each turning impulse on the cross piece a fresh fastener is picked up and a finished fastener leaves the transporter.

We claim:

1. In a transporter device, forming part of dress fastener making machine, a spindle (8) rotating in bearings and movable vertically, a cross piece with four arms (6), the said cross being supported by the said spindle (8), a socket (1) fitted to each arm of the cross piece, said socket containing a slide (2) acted on by a spring, and the said slide provided with a pin (3) for holding the fastener, a rocker arm (16) acting on the said spindle and producing the vertical sliding movement in same, a cam (17) which turns the rocker arm on its pivot, the said cam being fitted on a shaft (18), the lower part of the spindle (8) being squared and passing through a hole in a ratchet wheel (9), a reciprocating link (10) provided with a pawl (11), acting on the ratchet wheel (9), a rocker lever (13), a cam (12), by means of which said lever produces the reciprocating movement in the link (10), which operation in turn produces an intermittent turning movement of the spindle (8), a safety spring (19) fitted in the top part of the spindle, a pin (20) supported by said spring, a ball (21) resting on the said pin which ball serves as the contact point for the rocker arm (16).

2. In a transporter device, forming part of dress fastener making machine, a spindle (8) rotating in bearings and movable vertically, a cross piece with four arms (6), the said cross being supported by the said spindle (8), a socket (1) fitted to each arm of the cross piece, said socket containing a slide (2) acted on by a spring, and the said slide provided with a pin (3) for holding the fastener, a rocker arm (16) acting on the said spindle and producing the vertical sliding movement in same, a cam (17) which turns the rocker arm on its pivot, the said cam being fitted on a shaft (18), the lower part of the spindle (8) being squared and passing through a hole in a ratchet wheel (9), a reciprocating link (10) provided with a pawl (11), acting on the ratchet wheel (9), a rocker lever (13), a cam (12), by means of which said lever produces the reciprocating movement in the link (10), which operation in turn produces an intermittent turning movement of the spindle (8), a stop block (25), a lug (26) fitted to each one of the arms of the cross piece, and the said stop block acting together with the lugs to stop the cross piece in correct position after each turning impulse on the spindle.

3. In a transporter device, forming part of dress fastener making machine, a spindle (8) rotating in bearings and movable vertically, a cross piece with four arms (6), the said cross being supported by the said spindle (8), a socket (1) fitted to each arm of the cross piece, said socket containing a slide (2) acted on by a spring, and the said slide provided with a pin (3) for holding the fastener, a rocker arm (16) acting on the said spindle and producing a vertical sliding movement in same, a cam (17) which turns the rocker arm on its pivot, the said cam being fitted on a shaft (18), the lower part of the spindle (8) being squared and passing through a hole in a ratchet wheel (9), a reciprocating link (10) provided with a pawl (11), acting on the ratchet wheel (9), a rocker lever (13), a cam (12), by means of which said lever produces the reciprocating movement in the link (10), which operation in turn produces an intermittent turning movement of the spindle (8), a lug (29), a guide slot (30) on each one of the arms of the cross piece, the said lug fitting in the beforementioned slots and serving to guide the cross piece during its vertical sliding movement.

4. In a transporter device, forming part of dress fastener making machine, a spindle (8) rotating in bearings and movable vertically, a cross piece with four arms (6), the said cross being supported by the said spindle (8), a socket (1) fitted to each arm of the cross piece, said socket containing a slide (2) acted on by a spring, and the said slide provided with a pin (3) for holding the fastener, a rocker arm (16) acting on the said spindle and producing the vertical sliding movement in same, a cam (17) which turns the rocker arm on its pivot, the said cam being fitted on a shaft (18), the lower part of the spindle (8) being squared and passing through a hole in a ratchet wheel (9), a reciprocating link (10) provided with a pawl (11), acting on the ratchet wheel (9), a rocker lever (13), a cam (12), by means of which said lever produces the reciprocating movement in the link (10), which operation in turn produces an intermittent turning movement of the spindle (8), a lug (31), a pin (4) fitted at each one of the slides (2) of the sockets (1), the said lug (31) acting with the pins (4) to effect the pushing off the fastener from the pin.

KLAS GUSTAV BLOMBERG.
BENGT AUGUST PETTERSSON.